(12) United States Patent
Lupke et al.

(10) Patent No.: US 6,401,320 B1
(45) Date of Patent: Jun. 11, 2002

(54) METHOD OF SIMULTANEOUSLY MAKING A PLURALITY OF METALLIC PIPES

(76) Inventors: Manfred A. A. Lupke, 92 Elgin Street, Thornhill, Ontario (CA), L3T 1W6; Stefan A. Lupke, 32 Vintage Lane, Thornhill (CA), L3T 1X6

( * ) Notice: Subject to any disclaimer, the term of this patent is extended or adjusted under 35 U.S.C. 154(b) by 0 days.

(21) Appl. No.: 09/482,350

(22) Filed: Jan. 14, 2000

(51) Int. Cl.⁷ .................................................. B23P 17/00
(52) U.S. Cl. ........................... 29/414; 29/415; 29/463; 138/157
(58) Field of Search ................................ 138/157, 158, 138/111, 115, 117; 29/414, 415, 445, 463, 412

(56) References Cited

U.S. PATENT DOCUMENTS

| 90,322 | A | * | 5/1869 | Vanstone |
| 355,867 | A | * | 1/1887 | Denison |
| 577,284 | A | * | 2/1897 | Camp |
| 1,149,592 | A | * | 8/1915 | Murray et al. |
| 1,320,893 | A | * | 11/1919 | Murray |
| 1,708,994 | A | * | 4/1929 | Wylie |
| 1,807,796 | A | * | 6/1931 | Reid |
| 1,974,337 | A | * | 9/1934 | Magnani |
| 2,329,938 | A | * | 9/1943 | Ortiz |
| 2,920,682 | A | | 1/1960 | Lindberg |
| 2,927,369 | A | * | 3/1960 | Coblentz et al. |
| 3,058,861 | A | * | 10/1962 | Rutter |
| 3,123,905 | A | * | 3/1964 | Thomas |
| 3,280,530 | A | * | 10/1966 | Rothenbach |
| 3,927,464 | A | * | 12/1975 | Wallsten |
| 4,359,811 | A | * | 11/1982 | Monroe |
| 4,377,894 | A | * | 3/1983 | Yoshida |
| 5,022,685 | A | | 6/1991 | Hal et al. |

FOREIGN PATENT DOCUMENTS

| GB | 560089 A | 3/1944 |
| GB | 694578 A | 7/1953 |
| GB | 1201488 A | 8/1970 |

* cited by examiner

Primary Examiner—David P. Bryant

(57) ABSTRACT

In a pipe made from a plurality of pipe sections, at least one of those sections has a curved configuration and each pipe section has opposite side flanges which are sealed with one another to hold the pipe sections together in forming the pipe.

4 Claims, 5 Drawing Sheets

US 6,401,320 B1

METHOD OF SIMULTANEOUSLY MAKING A PLURALITY OF METALLIC PIPES

FIELD OF THE INVENTION

The present invention relates to a metallic pipe and a method of making same.

BACKGROUND OF THE INVENTION

The traditional method of making metallic pipe comprises roll forming a single piece of metallic material into a circular configuration and then securing the free ends of the roll formed material in completing the pipe construction.

The above pipe forming method as described for example in European Patent EP 0581208 B1 only allows the pipe to be made one at a time and as such is a relatively costly and time consuming process.

SUMMARY OF THE PRESENT INVENTION

The present invention provides a novel method of forming metallic pipe in which a plurality of pipes can be made side by side with one another at one time in a much faster and more efficient manner than has been available in the past.

More particularly, a pipe made in accordance with the present invention is formed from a plurality of pipe sections which have opposite side flanges and in which the flanges of the pipe sections are brought together and then sealed with one another to hold them together in forming the pipe.

The novel concept of forming pipe sections with joinable flanges provides numerous benefits which will be made apparent from the description below.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
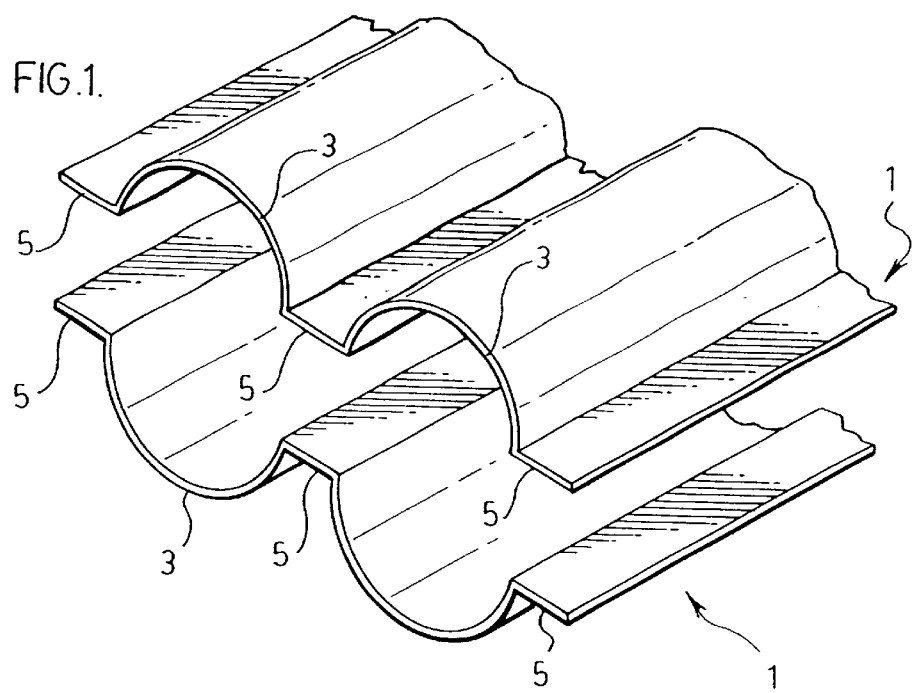
FIG. 1 is a perspective view of metallic pipe forming components ready to be assembled in forming a plurality of metallic pipes according to a preferred embodiment of the present invention.
Figure 2:
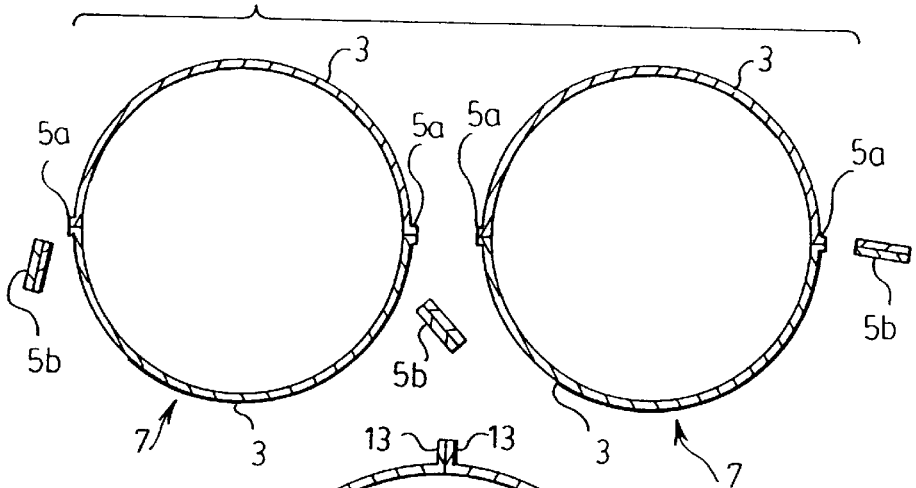
FIG. 2 is an end view of a pair of pipes formed using the components of FIG. 1.

FIG. 1 shows a pair of metallic pipe forming members generally indicated at 1 that cooperate with one another in forming two metal pipes generally indicated at 7 seen in FIG. 2 of the drawings.

More specifically, each of the pipe forming members 1 comprises a pair of semi-circular regions 3 with flanges 5 between and to opposite sides of the semi-circular regions. In forming the two pipes, the pipe members brought together with one another at the flanges with the flanges then being sealingly secured to one another. After this operation has been completed the bulk of the secured flange region as indicated at 5b in FIG. 2 is removed leaving a very small secured flange region 5a to each side of each pipe.

Although FIG. 1 shows that each pipe forming member 1 includes two semi-circular regions, it is to be understood that the pipe forming members could comprise a single semi-circular region with flanges to its opposite sides to form a single pipe, or each pipe forming member could include three flanged semi-circular regions used to form three of more pipes.

As will be appreciated from the description immediately above, one of the prime benefits of the present invention lies in the ability to provide, through a simple stamping and cutting operation, partial pipe sections that cooperate with other similarly formed partial pipe sections that can then be brought together again in a very simple manner to make essentially an unlimited number of pipes at one time.

With respect to the actual securing and sealing of the pipe forming sections to one another, this can be done either through adhesives or through some type of ultra-sonic welding operation or the like.

Figure 3:
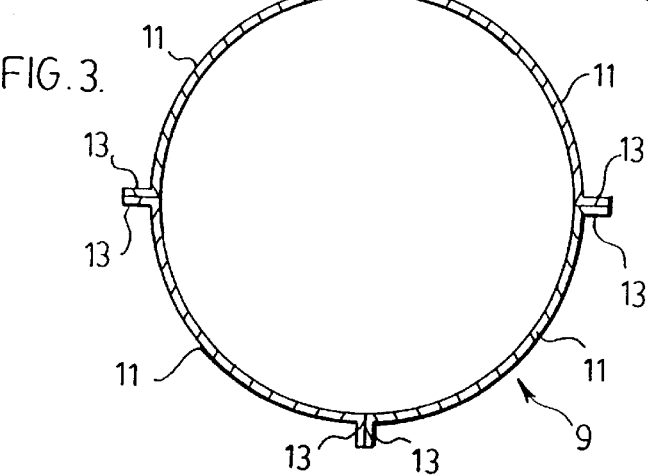
FIG. 3 is an end view of a metallic pipe formed according to a further preferred embodiment of the present invention.

FIG. 3 shows a metallic pipe generally indicated at 9 formed from a plurality of metallic pipe forming members 11. Each of these pipe forming members is provided at its opposite ends with a flange 13. The flanges 13 of adjacent pipe forming members 11 are sealingly secured to one another.

Figure 9:
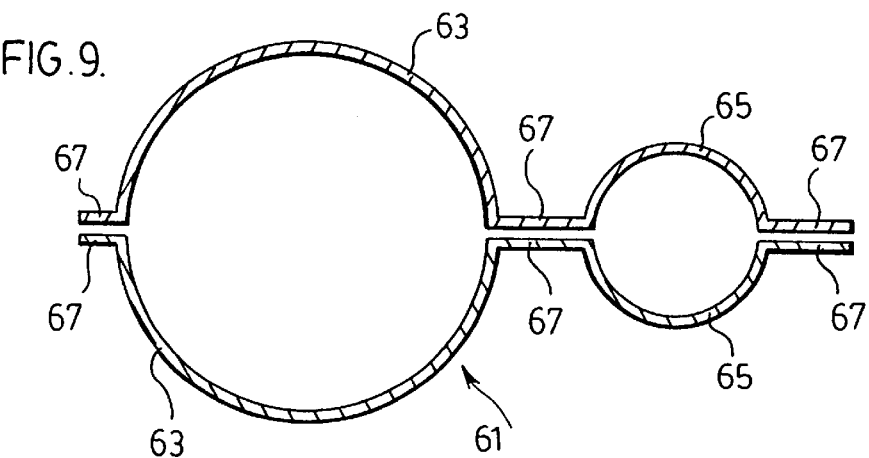

As was the case of the pipes shown in FIG. 2, the bulk of the secured flange area in the pipe of FIG. 9 will then be removed leaving the pipe with a substantially flush exterior surface.

Figure 4:
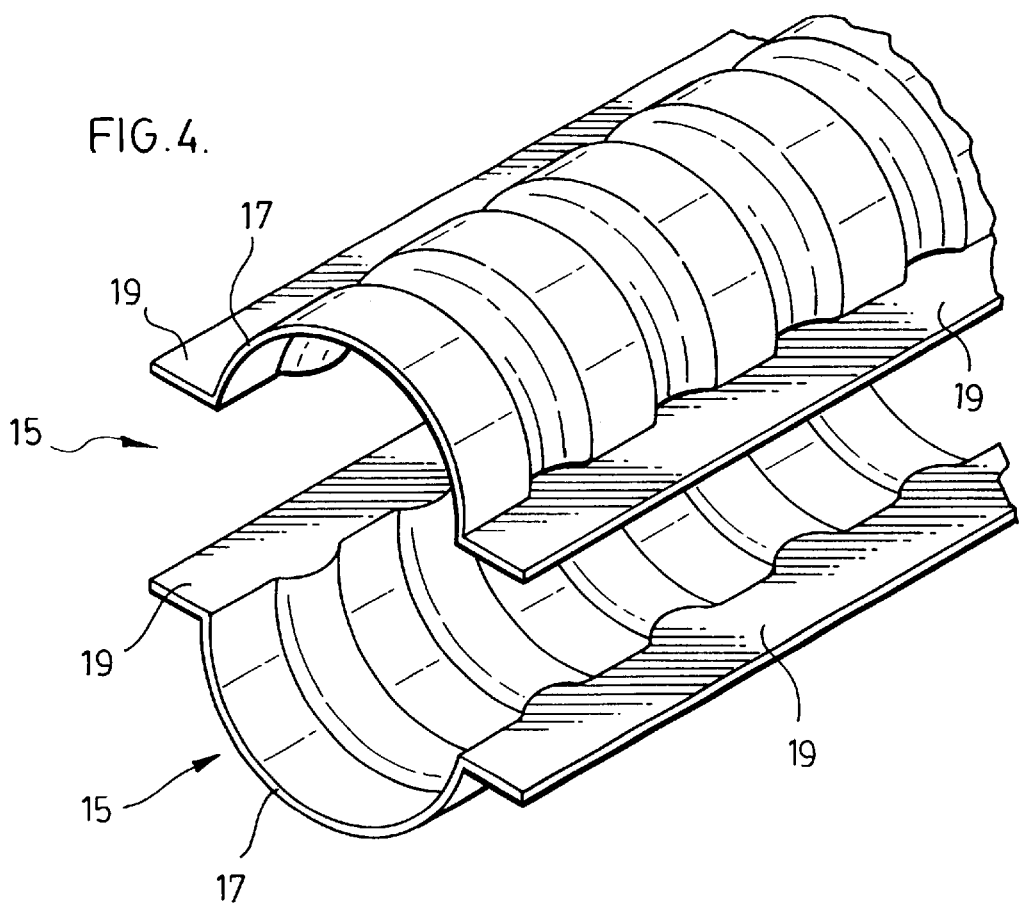
FIG. 4 is a perspective view of a pair of pipe components used in forming a metallic pipe according to a further aspect of the present invention.
Figure 5:
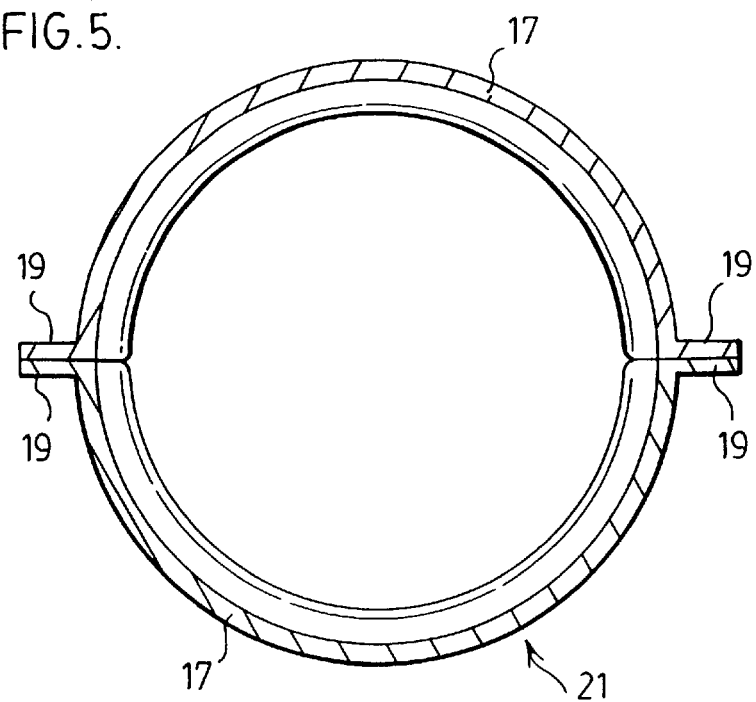
FIG. 5 is a end view of the pipe using the components of FIG. 4.

FIG. 3 demonstrates the feature that the pipe can be formed from more than two pipe forming members and in this case is formed by four pipe forming members. It is to be appreciated however that any number of pipe forming members having flanges to be secured to other pipe forming members can be used in the formation of a metallic pipe according to the present invention;

FIGS. 4 and 5 show that unlike the smooth walled pipe shown in FIGS. 1 through 3, the invention can be used to form a profiled walled pipe 21. This pipe is formed by a pair of pipe forming members 15 having semi-circular regions 17 with outwardly extending flanges 19 to opposite ends of the semi-circular regions. Each of these semi-circular regions has a wavey surface lengthwise of the pipe forming member to give pipe 21 a corrugated single wall construction.

FIG. 5 shows the flanges 19 of the two pipe forming members immediately after formation of the pipe. In order to complete this formation, the flanges are once again cut back essentially flush with the exterior surface of the pipe.

Figure 6:
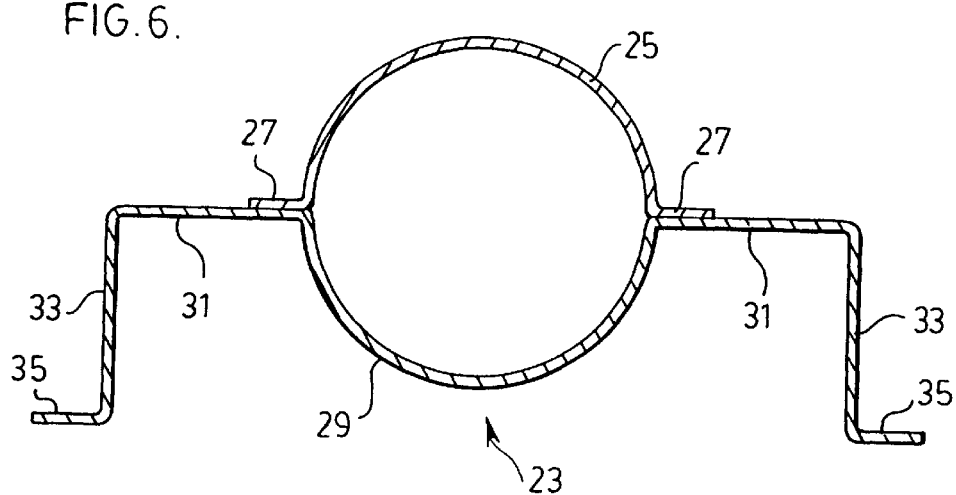
FIGS. 6 though 10 are end views of metallic pipes made in accordance with various different preferred embodiments of the present invention.

FIG. 6 of the drawings, shows a metallic pipe generally indicated at 23. This pipe is formed by an upper pipe forming member comprising a semi-circular region 25 having opposite end flanges 27. It is also formed by a lower pipe forming member having a semi-circular region 29 completed to its opposite ends with flanges 31. However, as well seen in FIG. 6, these flanges are substantially longer than anything earlier described and continue to vertical legs 33 which are completed with feet 35. Accordingly, pipe 23 is one which is self-supported by the novel construction of the flanges on the lower pipe forming member.

Figure 7:
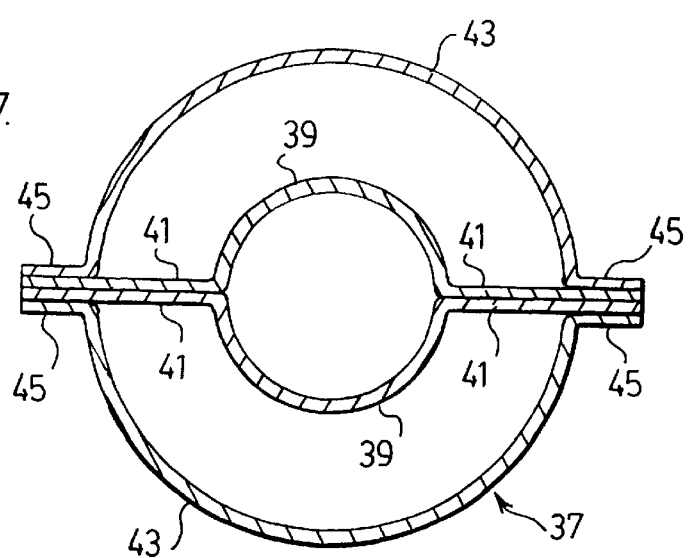

FIG. 7 shows the use of the invention in forming a double wall metal pipe generally indicated 37. In this pipe construction, the inner wall of the pipe is formed by a pair of pipe forming members each of which comprises a center semi-circular region 39 having flanges 41 to their opposite ends. The flanges 41 of the two pipe forming members are secured to one another.

Provided exteriorly of the inner wall of the pipe is a metallic outer wall formed by a pair of pipe forming members each of which comprises a semi-circular region 43 terminated with flanges 45. In this case, the flanges 45 of the two outer pipe forming members are sealed to the flanges 41 of the inner pipe forming member.

As was the case in the earlier embodiments, pipe 37 is completed by removing the excess flange at the exterior wall of the pipe.

In the pipe shown in FIG. 7, there is sufficient spacing between the inner and outer wall of the pipe to use each pipe wall as a separate product conveyor, i.e. the center region of the pipe defined by the inner pipe wall can be used for conveying of one substance and the hollow region defined by the inner pipe wall and the outer pipe wall can be used for conveying a totally different substance.

By using the same general construction as that shown in FIG. 7, but by changing the proportion of the inner wall relative to the outer wall, double wall metal pipe can be formed in which the inner wall is essentially next to the outer wall so that the two walls rely upon one another for wall strengthening purposes.

Figure 8:
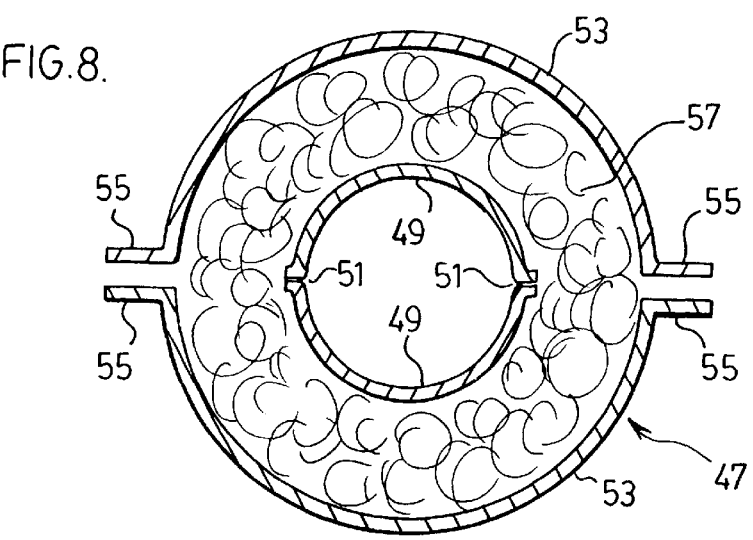

FIG. 8 of the drawings shows another form of double walled metal pipe 47. This pipe comprises an inner wall formed by a pair of wall forming members each having semi-circular regions 49 and secured flanges 51. In pipe 47, the excess flange material at the secured flange regions 51 has already been removed.

The outer pipe wall is formed by a pair of pipe forming members each having semi-circular regions 53 and flanges 55 which are sealingly secured between the upper and the lower pipe forming member.

In pipe 47, the inner and outer pipe walls are maintained in their respective positions by a solid filler 57. This filler may be an insulating material enabling material requiring a substantial degree of insulation to be passed through the central hollow region of the pipe.

FIG. 9 shows a metallic pipe generally indicated at 61. This pipe is formed by upper and lower pipe forming members each of which comprises a pair of semi-circular regions 63 and 65 with flanges 67 to opposite ends of each of the semi-circular regions. The flanges 67 of the two pipe forming members are sealingly secured to one another.

As can be clearly seen in FIG. 9, the semi-circular regions 63 are of much greater girth than the semi-circular regions 65 of each of the pipe forming members. Accordingly, pipe 61 essentially comprises two pipe sections of different diameter formed simultaneously when the pipe forming members are sealingly secured to one another. The first larger diameter pipe section formed by semi-circular region 63 can be used for one purpose, e.g. the flowing of liquids and the second smaller diameter pipe section formed by semi-circular regions 65 use for a completely different purpose e.g. as a wire conduit or the like. This particular design is particularly useful for heating and plumbing applications where the water and the wiring run side by side with one another.

In the FIG. 9 pipe formation, the construction would be completed by removing the excess flange material to the outside of the overall pipe construction. However, the flange region between the two pipe sections would remain intact as shown in FIG. 9.

Figure 10:
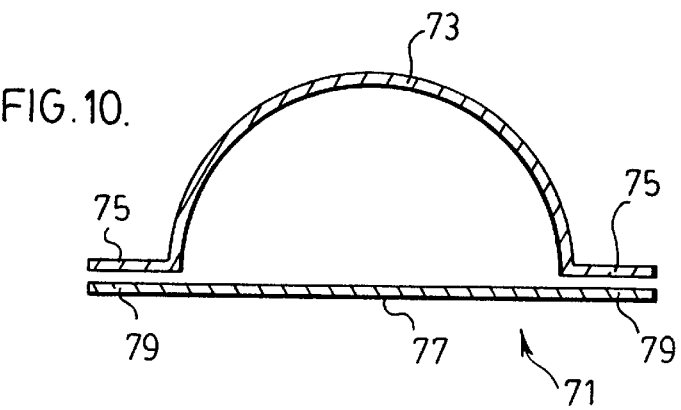

FIG. 10 of the drawings exemplifies another feature of the invention in forming a metal pipe generally indicated at 71. This pipe is formed by an upper pipe forming member having a semi-circular region 73 bordered by flanges 75. The lower pipe forming member however has a totally different construction and comprises a flat metallic wall 77 having outer flange regions 79 planar with the remainder of the wall forming member. These outer flange regions 79 are sealingly secured to the flanges 75 of the upper wall forming member.

Pipe 71 can be completed by removing some of the overlapping flange area between flanges 75 and 79 or in this case, the pipe construction may remain as shown in FIG. 10.

FIG. 10 clearly demonstrates that a metal pipe formed in accordance with the present invention can take on many different shapes in fact it is to be understood from FIG. 10 that the hollow of the pipe formed by the recessed region in at least one of the pipe forming members can have something other than a circular or even a semi-circular configuration. For example, the hollow region of the pipe could have a triangular, a rectangular or any other shape as required for its particular use and/or the shape of the opening through which it is to be fitted.

The most up to date plumbing pipe uses copper construction. However, it is now know that certain undesirable elements are drawn out of copper over time in the presence of liquid. According there is a need to form a metallic pipe with an internal layer for use in the plumbing as well as other fields. FIGS. 11 through 14 of the drawings show different metallic pipe constructions made in accordance with the present invention that fulfill these requirements.

Figure 11:
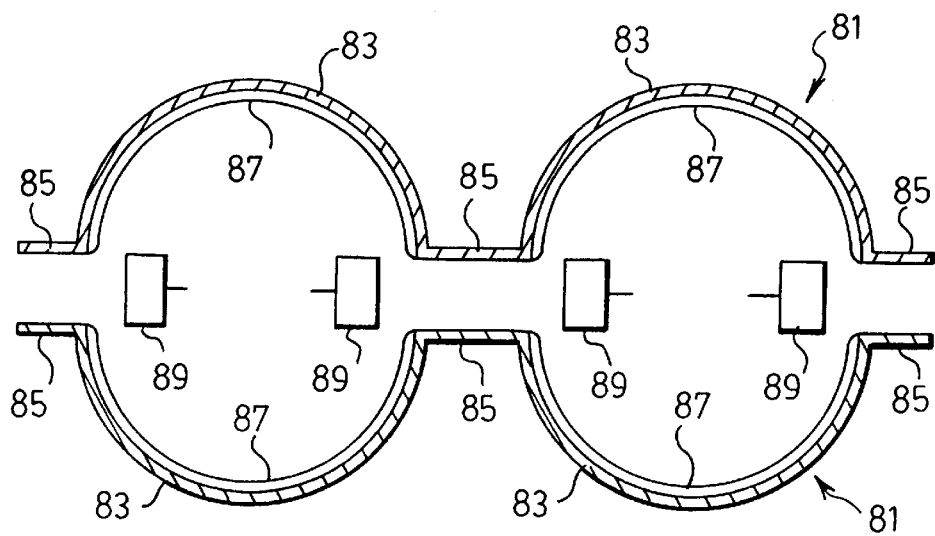
FIG. 11 is an end view of a pair of components used to form yet a different metallic pipe according to still another embodiment of the present invention.

FIG. 11 shows a pair of pipe forming members 81 similar to those shown in FIG. 1 and one again used to form a pair of circular pipes. These pipe forming members comprise semi-circular regions 83 having end flanges 85. The end flanges are sealingly secured to one another and the excess flange material is then removed again as earlier described.

The difference between the FIG. 11 and the FIG. 1 construction is that in FIG. 11, the pipe forming members are further provided with a plastic layer 87 along the interior surface thereof. After the two pipe forming members have been secured at their flanges with one another, heating elements 89 are run along the juncture between the two pipe forming members to melt the plastic and eliminate any plastic gaps between the upper and lower pipe forming members along the interior surface of the two formed pipes.

It is once again to be understood that although FIG. 11 specifically shows the formation of two plastic lined pipes, this same formation technique could be used to simultaneously form any different number of plastic lined pipes.

Figure 12:
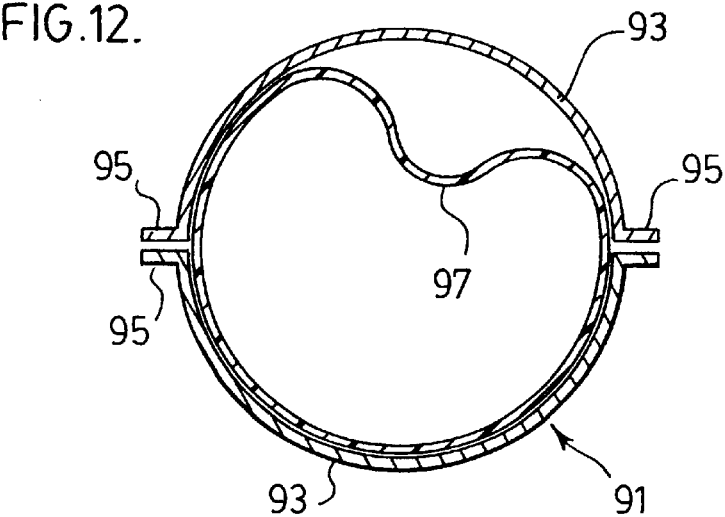
FIG. 12 is an end view showing the formation of a metallic pipe according to yet another embodiment of the present invention.
Figure 13:
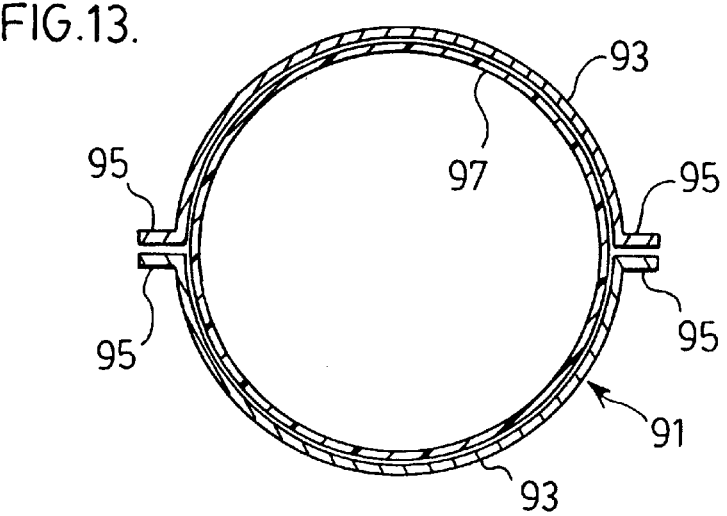
FIG. 13 is an end view of the completed pipe of FIG. 12.

FIG. 12 shows another method of making a metallic interiorly lined pipe generally indicated at 91.

More particularly, the main body of the pipe is formed by upper and lower metallic pipe forming members comprising semi-circular regions 93 terminating with flanges 95 where the two pipe forming members are secured to one another. Provided interiorly of the pipe is a bladder like liner 97 inserted into the pipe in a somewhat deflated condition.

From here, means to expand the plastic bladder 97, e.g. air pressure or the like, is used to blow the bladder out onto the interior wall of the metallic pipe. The bladder may be provided with an adhesive exterior to secure it to the wall of the pipe or the bladder may have sufficient rigidity such that it in effect pops open to hold its shape against the interior wall of the pipe.

Figure 14:
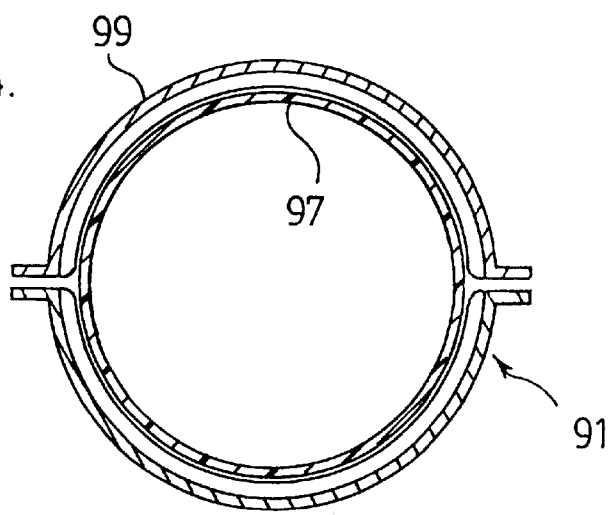
FIG. 14 is an end view of a metallic pipe according to another preferred embodiment of the present invention.

FIG. 14 shows a further feature of the present invention in which pipe 91 in addition to having the interior plastic liner 97 also includes an exterior plastic lining 99.

It is to be understood that the term metallic used for the pipe construction of the present invention can include many different types of metallic materials. A particularly preferable metallic construction however comprises aluminum and/or copper shielded aluminum. However, it is to be understood that other metals could also be used in the pipe construction of the present invention.

Accordingly, although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A method of simultaneously making a plurality of pipes, said method comprising forming first and second pipe sections, each pipe section including a plurality of pipe forming members side by side and joined with one another by flange portions, each pipe forming member comprising part of one of the pipes to be made, sealing the first and second pipe sections together at the flange portions of the first and second pipe sections and separating the pipes by severing the flange portions between the pipe forming members.

2. A method as claimed in claim 1 comprising forming the pipe forming members in each pipe section with different shapes and sizes.

3. A method as claimed in claim 1 comprising forming the pipe sections with shapes which differ between the first and second pipe sections.

4. A method as claimed in claim 1 comprising making said first and second pipe sections from a metallic material.

\* \* \* \* \*